United States Patent
Yoshikawa

[11] Patent Number: 5,883,617
[45] Date of Patent: Mar. 16, 1999

[54] POINTING DEVICE WITH IMPROVED CURSOR CONTROL DATA

[75] Inventor: Osamu Yoshikawa, Tokyo, Japan

[73] Assignee: SMK Corporation, Tokyo, Japan

[21] Appl. No.: 661,452

[22] Filed: Jun. 11, 1996

[30] Foreign Application Priority Data

Jul. 21, 1995 [JP] Japan .................................. 7-206736

[51] Int. Cl.⁶ ............................................ G09G 5/08
[52] U.S. Cl. .................................... 345/157; 345/173
[58] Field of Search .............................. 345/173, 174, 345/175, 179, 180, 181, 182, 157, 156, 145, 159, 160; 178/19.01, 19.04, 19.05, 18.01

[56] References Cited

U.S. PATENT DOCUMENTS

| | | | |
|---|---|---|---|
| 4,831,359 | 5/1989 | Newell | 345/173 |
| 5,541,370 | 7/1996 | Matsuda et al. | 345/173 |
| 5,670,755 | 9/1997 | Kwon | 345/173 |

FOREIGN PATENT DOCUMENTS 2139762  11/1984  United Kingdom ................... 345/173

Primary Examiner—Chanh Nguyen
Attorney, Agent, or Firm—Armstrong, Westerman, Hattori, McLeland & Naughton

[57] ABSTRACT

The present invention provides a pointing device which can be mounted in a limited space in a PC housing with no gap therebetween and which permits continued control of a cursor on the PC screen regardless of the size of a tablet sheet. Cursor control data is produced from data about the positional relationship between a pressed position $(x_n, y_n)$ on the tablet sheet and a fixed reference position $(x_0, y_0)$. Since the relative position data represents the distance and direction of the pressed position relative to the reference position, the movement of the cursor can be controlled by changing only the position where to press the tablet sheet relative to the reference position when the cursor control data is provided to a personal computer. Hence, even if the tablet sheet is narrow, the cursor can be controlled continuously. Additionally, marginal portions of the tablet sheet can be closely joined to the PC housing with no gap therebetween.

5 Claims, 9 Drawing Sheets

|   | x | y |
|---|---|---|
| (1) | $C(x_1 - x_0)$ | $C(y_1 - y_0)$ |
| (2) (3) | $C(x_2 - x_0)$ | $C(y_2 - y_0)$ |
| (4) | $C(x_3 - x_0)$ | $C(y_3 - y_0)$ |
| (5) (6) | $C(x_4 - x_0)$ | $C(y_4 - y_0)$ |

Fig.7

| BIT NO. | 6 | 5 | 4 | 3 | 2 | 1 | 0 |
|---|---|---|---|---|---|---|---|
| FIRST BYTE | 1 | L | R | Y7 | Y6 | X7 | X6 |
| SECOND BYTE | 0 | X5 | X4 | X3 | X2 | X1 | X0 |
| THIRD BYTE | 0 | Y5 | Y4 | Y3 | Y2 | Y1 | Y0 |

MBS … LSB

|     | X'            | Y'            |
| --- | ------------- | ------------- |
| (1) | $C(x_1 - x_0)$ | $C(y_1 - y_0)$ |
| (2) | $C(x_2 - x_1)$ | $C(y_2 - y_1)$ |
| (3) | $C(x_3 - x_2)$ | $C(y_3 - y_2)$ |
| (4) | $C(x_4 - x_3)$ | $C(y_4 - y_3)$ |

POINTING DEVICE WITH IMPROVED CURSOR CONTROL DATA

FIELD OF THE INVENTION

The present invention relates to a pointing device for personal computers (hereinafter referred to as PCs) which outputs cursor control data for moving the cursor on the PC screen.

BACKGROUND OF THE INVENTION

With recent developments in Graphical User Interface (GUI) environments, a pointing device has come into wide use as a substitute for the keyboard in PC operations. The pointing device moves the cursor to a window, icon or similar visual interface to enable the PC to execute the operation designated by the window or icon.

Conventional pointing devices include those which are independent of PCs, such as a mouse. However, with the widespread use of notebook or similar portable PCs, there has been a demand for a pointing device which is easy to carry along with the PC and which saves space for operation on the go. To meet such a demand, a pointing device of the type that is built into the PC main unit has been developed.

FIGS. 8 through 10 illustrate a conventional pointing device 100 built in the main unit of a PC 110. As shown in FIG. 8, a control button 101 is mounted in a PC housing 111 and protrudes from the keyboard panel so that a user actuates it with his thumb while holding other fingers at home positions.

As depicted in FIG. 9, the control button 101 is composed of a truncated conical stick 102 and a disc-shaped flange 103 which are formed in a single piece of hard rubber. A fulcrum projection 104 on the underside of the flange 103 is loosely fitted in a positioning hole made in a rigid panel 105 so that the control button 101 is rockingly supported on the rigid panel 105.

At four corners around the control button 101, strain gauges or similar pressure-sensitive elements 106a to 106d are disposed. The strain gauges or pressure-sensitive elements 106a to 106d have pressure receiving pieces 107a to 107d held just above the circumferential margin of the flange 103 at four places, respectively. The strain gauges or pressure-sensitive elements 106a to 106d are each connected to a transducer (not shown) for transducing the output of the strain gauges or pressure-sensitive elements 106a to 106d to voltage.

With the pointing device of the above described construction, when the stick 102 is tilted, a tensile force is applied to the pressure-sensitive element pressed by the stick 102 and the voltage corresponding to the tensile force is output from the transducer.

A microcomputer (not shown), which is equipped in the pointing device 100, detects the direction of tilt of the stick 102 by comparing output voltages from the four pressure-sensitive elements 106a to 106d and the angle of tilt of the stick 102 on the basis of a voltage change, and produces and sends out cursor control data to the PC 110. That is to say, the direction and angle of tilt of the stick 102 are used to produce 8-bit positional data in the X and Y directions, which is sent out as part of the cursor control data to the PC 110.

To make the pointing device 100 compatible with a mouse or other tablet pointers, the cursor control data mentioned herein uses the same data format as that of cursor control data that is output from the mouse or similar.

FIG. 7 is a table showing an example of the data format of the cursor control data. Positional data in the X direction of the 3-byte cursor control data is contained at bit positions X0 to X7. Positional data in the Y direction of the 3-byte cursor control data at bit positions Y0 to Y7.

Thus, the conventional pointing device 100 permits controlling movements of the cursor according to the direction and amount of tilt of the stick 102 in the same manner as does the manipulation of the mouse.

The pointing device 100, though capable of outputting 8-bit positional data as the cursor control data, detects the direction and amount of tilt of the stick 102 by the use of only the four pressure-sensitive elements 106a to 106d. Therefore, the pointing device 100 cannot attain high resolution in both of the direction and the amount of tilt of the stick 102 and cannot control the cursor exactly in response to the stick manipulation.

On the other hand, only a limited number of pressure-sensitive elements can be provided in the narrow space defined in the PC housing 111 and an increase in the number of the pressure-sensitive elements would only make circuitry complex and raise the manufacturing costs accordingly.

Further, as shown in FIG. 9, there is a gap 113 between the rocking stick 102 and the PC housing 111. Water, dust or foreign particles may get in the housing 111 through the gap 113 and thus, cause malfunctions of circuit components in the PC housing 111.

As a pointing device with high stick control resolution but free from the above-mentioned problem of the gap 113, a tablet pointer is known that makes use of the principles of operation of a tablet, a digitizer and so forth. This tablet pointer derives positional data from the position on the tablet sheet where it is being pressed, and outputs cursor control data, ensuring accurate detection of the absolute position on the tablet sheet being pressed. By tightly joining the marginal edges of the tablet sheet to the PC housing 111, there will be no gap between the marginal edges of the tablet sheet and the PC housing even during operation.

To form a PC-contained pointing device by mounting the above-mentioned conventional tablet pointer in the PC housing 111, however, the operation area of the tablet sheet needs to be reduced. Thus, the pointing device poses a problem in its operability in the case of continuously moving the cursor, because it is necessary that the tablet sheet be pressed in two or more steps as described below.

FIG. 11(a) shows the case of moving the cursor from a point 0 to (4) via (1), (2) and (3) on a PC screen 112.

The cursor can be moved from the point 0 to (1) on the PC screen 112 by pressing the tablet sheet 107 from a point "0" to (1) with the user's finger, for instance. The tablet pointer calculates absolute positions $(x_0, y_0)$ and $(x_1, y_1)$ of the points "0" and (1) in the X and Y directions and multiplies their difference, i.e., the relative position (X', Y'), by a predetermined constant C to obtain positional data (see FIG. 11(b)).

The PC 110 moves the cursor on the screen 112 according to the cursor control data containing such positional data, so the cursor moves in proportion to the value of relative movement data.

Similarly, continuing the pressing of the tablet sheet 107 to the point (3) via (2), the cursor draws on the PC screen 112 a locus similar to the path of the finger on the tablet sheet 107.

As mentioned previously, however, the tablet sheet 107 needs to be as small as about 3 square centimeters, far smaller than the PC screen 112; consequently, even when the point (4) still remains unreached by the cursor on the screen 112 as depicted in FIG. 11(*a*), the pressing of the tablet sheet 107 can no longer be effected. The frequent occurrence of such an interruption of the tablet sheet pressing operation makes the cursor control cumbersome.

A similar problem can arise when moving the cursor merely straight for a relatively long distance on the PC screen 112. That is, to move the cursor straight for a long distance on the PC screen 112, it is necessary to repeat pressing of the tablet sheet 107 over a certain distance thereon in the same direction a plurality of times.

A possible solution to these problems is to use a large constant C, but this fails to minutely control the movement of the cursor, and hence also presents the problem of the lack of operability.

Another possible solution is to contain the absolute position on the tablet sheet 107 as positional data in the cursor control data. Unfortunately, this method also encounters, but cannot settle, a problem similar to that in the case of deriving the positional data from the afore-mentioned relative position.

SUMMARY OF THE INVENTION

It is therefore an object of the present invention to provide a pointing device which has no gap between it and the personal computer to keep water, dust or foreign particles out, yet permits continued cursor control operation even if the tablet sheet is narrow.

According to a first aspect of the present invention, the pointing device is mounted in the PC housing and outputs cursor control data for moving the cursor on the PC screen. The pointing device includes: a tablet sheet formed by a pair of opposed tablet film sheets disposed in parallel with a very small gap defined therebetween; pressed position detecting means for detecting, as a tablet sheet pressed position, the position where the one of the tablet film sheets is pressed into contact with the other; and reference position setting means for setting a fixed position on the tablet sheet as a reference position at least until the pressure is removed from the tablet sheet after being applied thereto. The pointing device derives cursor control data from data on the positional relationship between the position on the tablet sheet being pressed and the reference position.

With the above arrangement, when the pressed position detecting means detects the position on the tablet sheet where it is being pressed, cursor control data is created on the basis of the data about the positional relationship between the pressed and the reference position. Since the relative position data represents the distance and direction of the pressed position relative to the reference position, the cursor moves on the PC screen toward the pressed position relative to the reference position when the cursor control data is sent out to the PC screen.

Hence, the cursor movement can be controlled by only changing the position where to press the tablet sheet around the reference position, and even if the tablet sheet is narrow, the cursor can continuously be controlled. Further, since the cursor movement is controlled by pressing the tablet sheet, the marginal edges of the tablet sheet can be tightly joined to the PC housing and no gap will be present between them.

According to a second aspect of the present invention, the reference position setting means sets, as the reference position, the position on the tablet sheet where it is pressed for the first time after the removal of the pressure applied thereto previously.

That is to say, upon each pressing of the tablet sheet, the reference position is set at the position where the pressure is applied first. Accordingly, even if the reference position shifts from the initially set position due to an environmental change or with the lapse of time, no malfunctions will occur because the reference position is reset upon each application of pressure to the tablet sheet.

According to a third aspect of the present invention, the reference position setting means sets the center of the tablet sheet as the reference position.

With such an arrangement, when pressing the tablet sheet at its peripheral portion, cursor control data based on the positional relationship of the pressed position to the center of the tablet sheet is provided and the movement of the cursor can be controlled by pressing the tablet sheet at one place alone. This avoids the need of setting the reference position upon each pressing of the tablet sheet, and hence speeds up the processing, while at the same time the tablet sheet need not be pressed continuously over a required distance—this improves the operability of the pointing device.

According to a fourth aspect of the present invention, a control button having a downward protrusion on the underside thereof is disposed on the tablet sheet, and the tablet sheet is pressed at selected positions by rocking the control button.

With such a configuration, it is possible to control the cursor in the same manner as in the case of using a joystick, with no gap formed between the pointing device and the PC housing. By mounting the pointing device in the same plane as that of the keyboard, the cursor can be controlled with any one of the user's fingers placed at their home positions.

BRIEF DESCRIPTION OF THE DRAWINGS

FIG. 4(*b*) is a table showing relative position data (X, Y) at each position in FIG. 4(*a*);

FIG. 6(*b*) is a sectional view of the pointing device 30 shown in FIG. 6(*a*);

FIG. 7 is a table showing an example of output format of the pointing device 10;

FIG. 11(*a*) is a diagram schematically showing the relationship between the path of the user's finger pressed against the tablet sheet 107 and the locus of the cursor on the PC screen 112.

DESCRIPTION OF THE PREFERRED EMBODIMENTS

A description will be given, with reference to the drawings, of working examples of the present invention.

Figure 1:
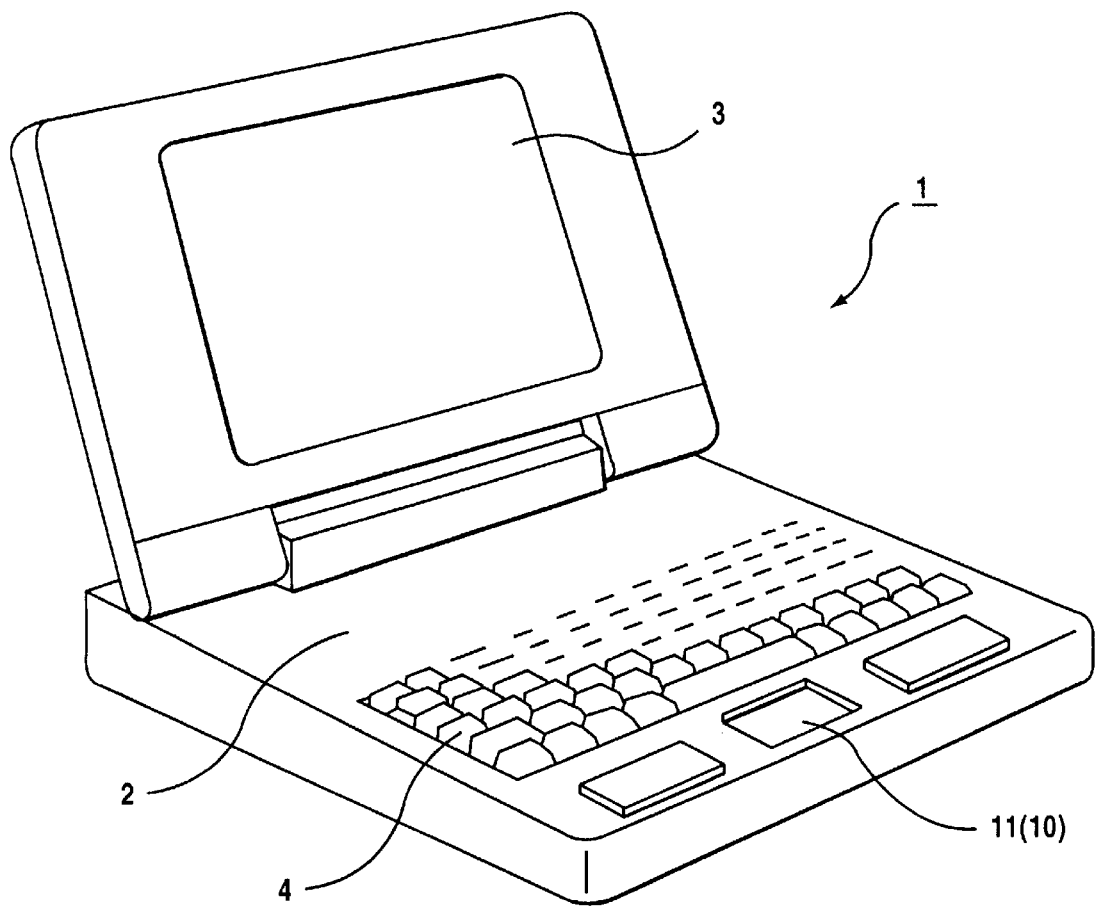
FIG. 1 is a perspective view of a personal computer 1 equipped with a pointing device 10 according to a first embodiment of the present invention.

FIG. 1 illustrates a personal computer (PC) 1 equipped with a display or screen 3 and a keyboard 4. The pointing device 10, according to this embodiment, is built in the PC housing 2.

Figure 2:
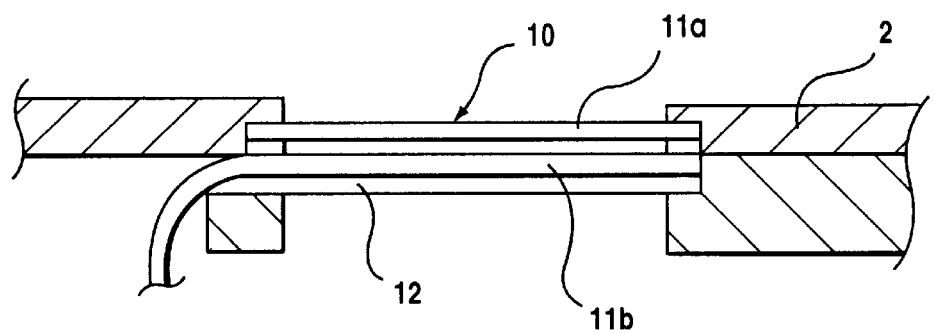
FIG. 2 is a sectional view showing how the pointing device 10 is incorporated in the personal computer 1.

As depicted in FIGS. 1 and 2, the pointing device 10 is composed of an iron plate or similar rigid plate 12 and a pair of slightly spaced-apart opposed tablet film sheets 11a and 11b supported on the rigid plate 12; the pointing device 10 is disposed in a rectangular window of the PC housing 2 with the upper tablet film sheet 11a exposed through the window.

The pointing device 10 of this embodiment detects the pressed position of the tablet film sheet 11a by the same position sensing means as those used in known electrostatic capacitance and resistor contact type tablets. The pointing device 10 adopts the resistor contact scheme in that the pair of opposed tablet film sheets 11a and 11b are each coated all over an inside surface with a homogeneous resistance layer and are slightly separated by an insulating dot spacer (not shown) formed by printing.

Applying a coordinate detecting voltage to the one electrode of the tablet sheet 11 and grounding the other electrode, potentials at the respective position on the tablet sheet 11 are generated in proportion to the distances from the electrode, thereby forming a potential gradient on the tablet sheet 11. The position on the tablet sheet 11 where pressure is being applied thereto is calculated from the potential at that pressed position on one of the tablet film sheets read out via the other.

Figure 3:
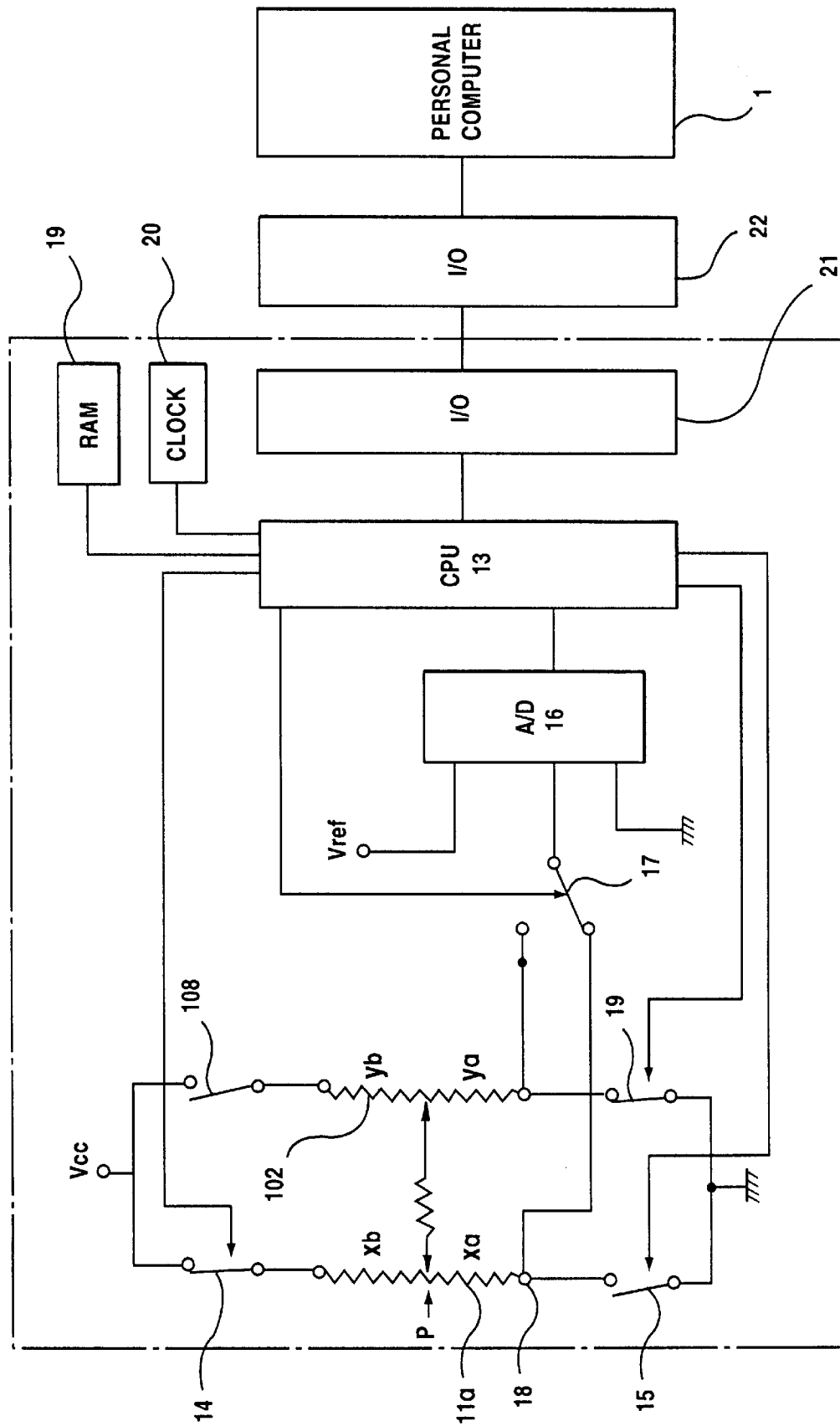
FIG. 3 is a circuit diagram illustrating the configuration of the pointing device 10.

FIG. 3 is a circuit diagram illustrating the configuration of the pointing device 10. A description will be given of the configuration of the pointing device 10 together with a method for detecting the pressed position (x, y) of the tablet sheet 11 and a method for creating cursor control data based on the detected pressed position and sending it out to the personal computer 1.

The detection of the pressed position (x, y) begins with closing switches 14 and 15 at the side of the X-coordinate tablet film sheet 11a under the control of a central processing unit or CPU to form a potential gradient all over the tablet film sheet 11a. In this instance, a switch 17 connected to an input terminal of an analog-to-digital or A/D converter 16 is connected to the electrode of the Y-coordinate tablet sheet 11b.

When the X-coordinate tablet film sheet 11a is pressed at a point P $(x_p, y_p)$ the potential Vp at the point P is given by $V_{cc} \times x_a \div (x_a + x_b)$ where $x_b$ is the resistance proportional to the distance from the voltage-applied electrode and $x_a$ the resistance proportional to the distance from the grounded electrode. The A/D converter 16 reads the potential Vp and the CPU 13 calculates therefrom an 8-bit X coordinate $(x_p)$.

This followed by opening the X-side switches 14 and 15 and closing Y-side switches 108 and 19 and the switch 17 connected to the input terminal of the A/D converter 16 is connected to the electrode 18 of the X-coordinate tablet film sheet 11a.

As is the case with the above, the potential Vp at the point P is given by $V_{cc} \times y_a \div (y_a + y_b)$, where $y_b$ is the resistance proportional to the distance from the voltage-applied electrode and ya the resistance proportional to the distance from the grounded electrode. The A/D converter 16 reads the potential Vp and the CPU 13 calculates therefrom an 8-bit Y coordinate $(y_p)$ The X coordinate $(x_p)$ and Y coordinate $(y_p)$ thus calculated are compared, as the pressed position (x, y), by the CPU 13 with a reference position $(x_0, y_0)$ The reference position is one that represents a fixed position on the tablet sheet 11 for at least the period of the application thereto of pressure. In this embodiment, the reference position is the position on the tablet sheet 11 where the pressure applied thereto is detected first after the removal of pressure applied previously.

The pressure is detected in a pressure detecting mode during which no voltage is applied to the tablet sheet 11, which is followed by a position detecting mode to detect the position on the tablet sheet 11 being pressed.

In the pressure detecting mode, the one switch 14 of the X-coordinate tablet film sheet 11a is closed and the other switch 15 is open to hold the X-coordinate tablet film sheet 11a at the potential Vcc, whereas the switch 108 of the Y-coordinate tablet film sheet 11b is open and the other switch 19 is closed to ground therethrough the Y-coordinate tablet film sheet 11b.

In this case, if the switch 17 connected to the input terminal of the A/D converter 16 is connected to the electrode 18 of the X-coordinate tablet film sheet 11a, the potential at the input terminal is Vcc as mentioned above.

Assuming that the X-coordinate tablet film sheet 11a is pressed at the point P, current flows from the point to the ground via the Y-coordinate tablet film sheet 11b and the switch 19 and the potential at the electrode 18 of the X-coordinate tablet film sheet a, that is, the potential at the input terminal of the A/D converter 16, drops to a predetermined value.

The CPU 13 compares the potential with a preset pressure detecting threshold value VT and, when the former is smaller than the latter, decides that the tablet sheet 11 is being pressed and then enters the position detecting mode.

The CPU 13 functions also as reference position setting means. That is, the pressed position (x, y) detected for the first time in the position detecting mode, namely, the position on the tablet film sheet 11a where its pressing begins, is stored by the CPU 13 as the reference position $(x_0, y_0)$ in a random access memory or RAM 19.

Further, until it detects the removal of the pressure applied to the tablet sheet 11, the CPU 13 calculates the relative position data (X, Y) by comparing the pressed position (x, y) with the reference position (x0, y0) at regular time intervals (500 msec, for instance) in response to a clock signal from a clock generator 20 and sends out cursor control data containing the relative position data (X, Y) to the PC 1 via an interface 21.

The PC 1 is designed to operate under the control of a driver or application program for various pointing devices and moves the cursor on the PC screen 3 in accordance with the cursor control data input via a serial interface 22.

The removal of the pressure applied to the tablet sheet 11 is detected by entering the pressure detecting mode upon each computation of the relative position data in the position detecting mode and detecting the contact between the tablet film sheets 11a and 11b. In the pressure detecting mode, when the potential at the input terminal of the A/D converter 16 is restored to the value Vcc, the CPU 13 decides that the pressure applied to the tablet sheet 11 has been removed, then stops the outputting of the cursor control data to the CPU 1 and, at the same time, initializes or resets the reference position (x0, y0) stored in the RAM 19.

Figures 4A, 4B:
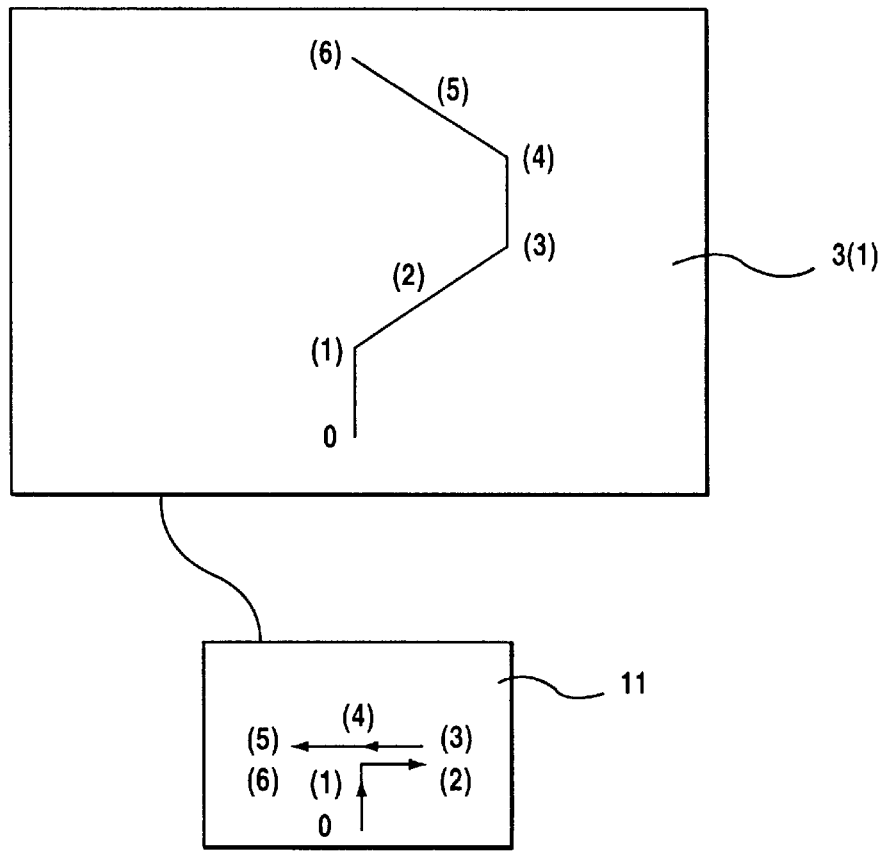
FIG. 4 (*a*) is a diagram schematically showing the relationship between the path of the user's finger pressed against a tablet sheet 11 and the locus of the cursor on a PC screen 3.
Figure 5:
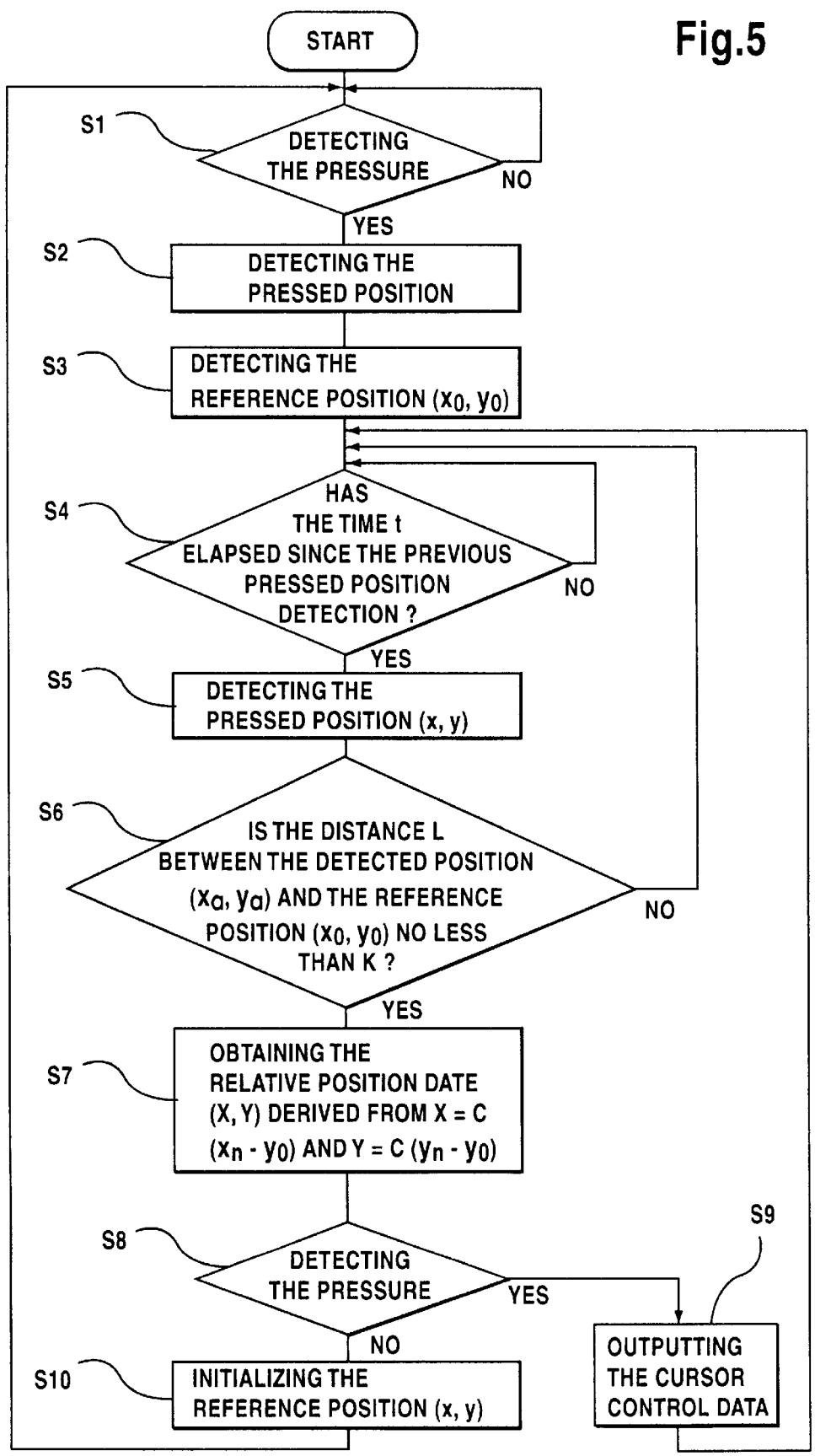
FIG. 5 is a flowchart showing the operation of the pointing device 10.

Turning next to FIGS. 4 and 5, the operation of the pointing device 10 will be described.

Figures 11A, 11B:
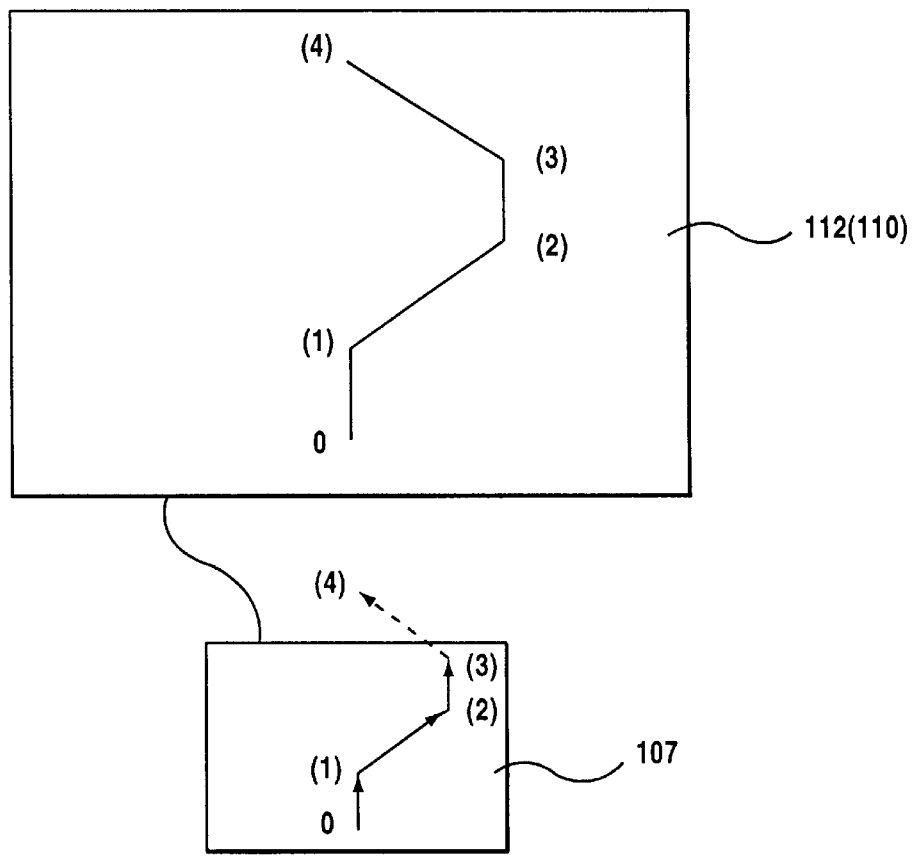
FIG. 11(b) is a table showing relative position data (X, Y) at each position in FIG. 11(a).

For comparison with the prior art example, a description will be given, with reference to FIG. 4(a), of the operation of the pointing device 10 in the case of moving the cursor on the PC screen 3 along the same locus as that shown in FIG. 11(a).

As described above, while in its waiting state, the pointing device 10 is in the pressure detecting mode and makes a check to see if the tablet sheet 11 is pressed (step S1).

Upon pressing the tablet sheet 11 at the position "0" where the pressing of the tablet sheet 11 is started, the CPU 13 detects the pressure in the pressure detecting mode and enters the pressed position detecting mode.

Upon detection of the coordinates (x, y) of the position "0" where the tablet sheet 11 is being pressed (step S2), the CPU 13 stores the pressed position (x, y) as the reference position $(x_0, y_0)$ in the RAM 19 (step S3) and proceeds to step S4.

In step S4, the CPU 13 makes a check to determine if a time t has elapsed since the previous pressed position detection so as to detect the pressed position at regular time intervals t and output data accordingly. After elapsed time t the CPU 13 goes to step S5 and detects the pressed position $(x_n, y_n)$ at that time.

Provided that the tablet sheet 11 is pressed at a position (1) of absolute coordinates $(x_1, y_1)$ at time t after the pressing at the position "0," the pressed position $(x_1, y_1)$ is detected.

When the distance between the thus detected position $(x_1, y_1)$ and the reference position $(x_0, y_0)$ is smaller than a predetermined distance Ln (Ln=5 mm, for instance), the CPU 13 decides that the tablet sheet 11 is pressed accidentally, and returns to step S4, repeating the above-described processing (step S6).

When the distance between the pressed position $(x_1, y_1)$ and the reference position $(x_0, y_0)$ is larger than the predetermined distance Ln, the relative position data (X, Y) is derived from the distance of the position $(x_1, y_1)$ relative to the reference position $(x_0, y_0)$ (step S7). The distance of the pressed position (1) relative to the reference position $(x_0, y_0)$ is obtained by $x_1-x_0$ and $y_1-y_0$, and the thus obtained relative distance is multiplied by the predetermined constant C to obtain relative position data $(C(x_1-x_0), C(y_1-y_0))$ (see FIG. 4(b)).

Upon obtaining the relative position data, the pointing device enters the pressure detecting mode and makes a check to see if the tablet sheet 11 is pressed (step S8).

Upon detecting that the tablet sheet 11 has not yet been pressed, the pointing device 10 adds the relative position data to the cursor control data and sends it out to the PC 1 (step S9). The relative position data (X, Y) is represented by eight bits in each of the X and Y directions and is contained in the cursor control data of the data format shown in FIG. 7.

The relative position data in the X direction of the 3-byte cursor control data is contained in the bit positions represented by $X_0$ to $X_7$ and the relative position data in the Y direction of the 3-byte cursor control data in the bit positions represented by $Y_0$ to $Y_7$. The cursor control data containing such relative position data is sent out to the PC 1 via the interface 21. Hence, the cursr on the PC screen moves from the position "0" to (1) along the same locus on the tablet sheet 11.

As long as the pressing of the tablet sheet 11 is continued toward a desired position, the pointing device 10 judges in step S8 that the tablet sheet 11 is being pressed, then outputs the cursor control data accordingly, and goes back to step S4, in which it enters the pressed position detecting mode, repeating the above-described operation.

Assuming that in step S4 the time t has elapsed since the detection of the pressed position (1) and the tablet sheet 11 is pressed at the position (2) of absolute coordinates $(x_2, y_2)$, cursor control data containing relative position data $(C(x_2-x_0), C(y_2-y_0))$ is provided to the PC 1 by the processing of steps S5 to S9. As shown in FIG. 4(a), the PC 1 responds to this cursor control data to move the cursor on its screen 3 in the same direction as that from the position "0" to (2) on the tablet sheet 11, not along the locus from the position (1) to (2) on the tablet sheet 11.

The cursor on the PC screen 3 can be moved further to the position (3) in the same direction by continued pressing of the tablet sheet at the same position. When the time t has elapsed in step S4, the coordinates of the position (3) where the tablet sheet 11 is being pressed at that time are the same as the coordinates $(x_2, y_2)$, so the pressed position detected in step S5 has the coordinates $(x_2, y_2)$. Consequently, cursor control data containing the same relative position data $(C(x_2-x_0), C(y_2-y_0))$ as that at the position (2) is sent out to the PC by the processing of steps S6 to S9, and the cursor on the PC screen 3 repeats the same movement from the position (2) to (3) as the movement from the point (1) to (2).

That is to say, since the relative position data represents the positional relationship of the pressed position to the reference position at regular time intervals t, the cursor on the PC screen 3 moves for each time t toward one of the positions around the reference position "0" in proportion to the distance between the reference position "0" and the pressed position on the tablet sheet 11.

Accordingly, in the case of moving the cursor from the position (4) to (6) on the PC screen 3, the tablet sheet 11 is pressed at positions (4), (5) and (6) one by one corresponding to the direction in which to move the cursor about the reference position "0".

At each position the processing of steps S4 to S9 is repeated, by which the cursor control data containing the relative position data (X, Y) shown in FIG. 4(b) is provided to the PC 1, which moves the cursor on its screen 3 as depicted in FIG. 4(a).

Upon removal of the pressure applied to the tablet sheet 11 after outputting the cursor control data at the position (6), the CPU 13 calculates in step S4 provisional relative position data (X, Y) in the state in which the pressure applied to the tablet sheet 11 is removed in step S7, but the removal of pressure is detected in step S8, the provisional relative position data (X, Y) is not sent out to the PC 1.

When detecting the removal of pressure in step S8, the CPU 13 judges that the sequence of operations has been completed, then initializes or resets the reference position $(x_0, y_0)$ stored in the RAM 19 and returns to step S1, entering the waiting state for detecting the next application of pressure to the tablet sheet 11.

As described above, this embodiment permits control of the movement of the cursor through the use of the tablet sheet 11 with a very small operation surface. Hence, the pointing device 10 can be mounted even in a narrow limited space in the PC housing 2. Further, since the relative position data can be expressed as 8-bit data in each of the X and Y directions, the cursor can be moved accurately in response to the manipulation of the pointing device 10.

While in the above, the tablet sheet 11 has been described to be pressed directly with the user's finger, it is also possible to move the cursor by manipulating a control button.

Figure 6A:
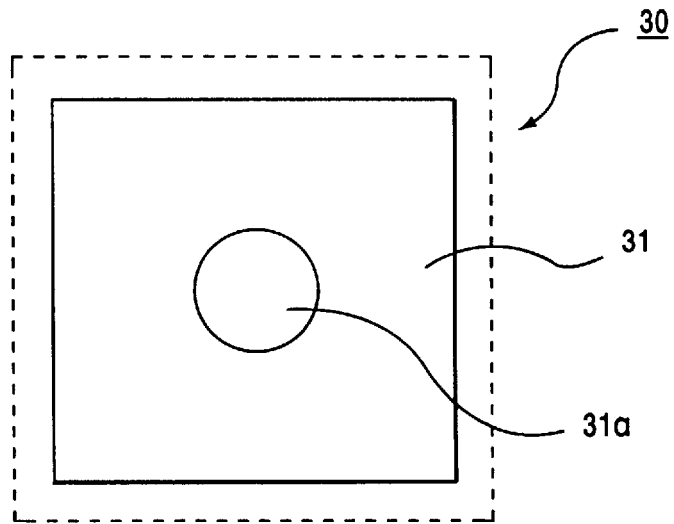
FIG. 6(*a*) is a plan view illustrating the principal part of a pointing device 30 according to a second embodiment of the present invention.
Figure 6B:
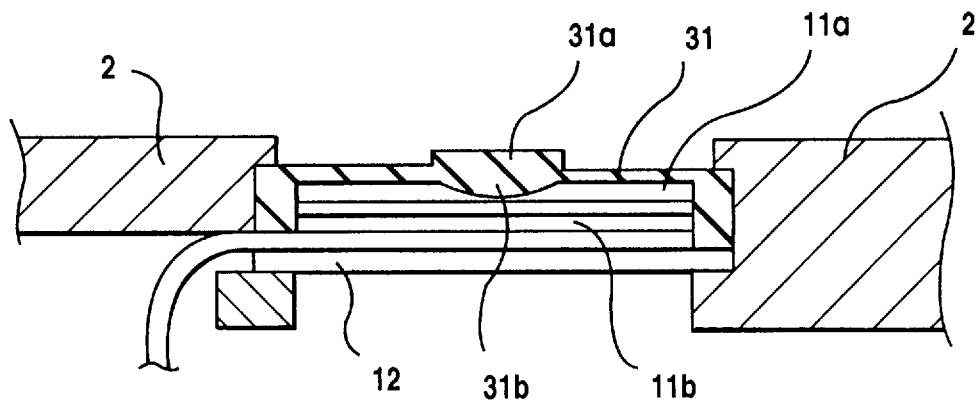
Figure 8:
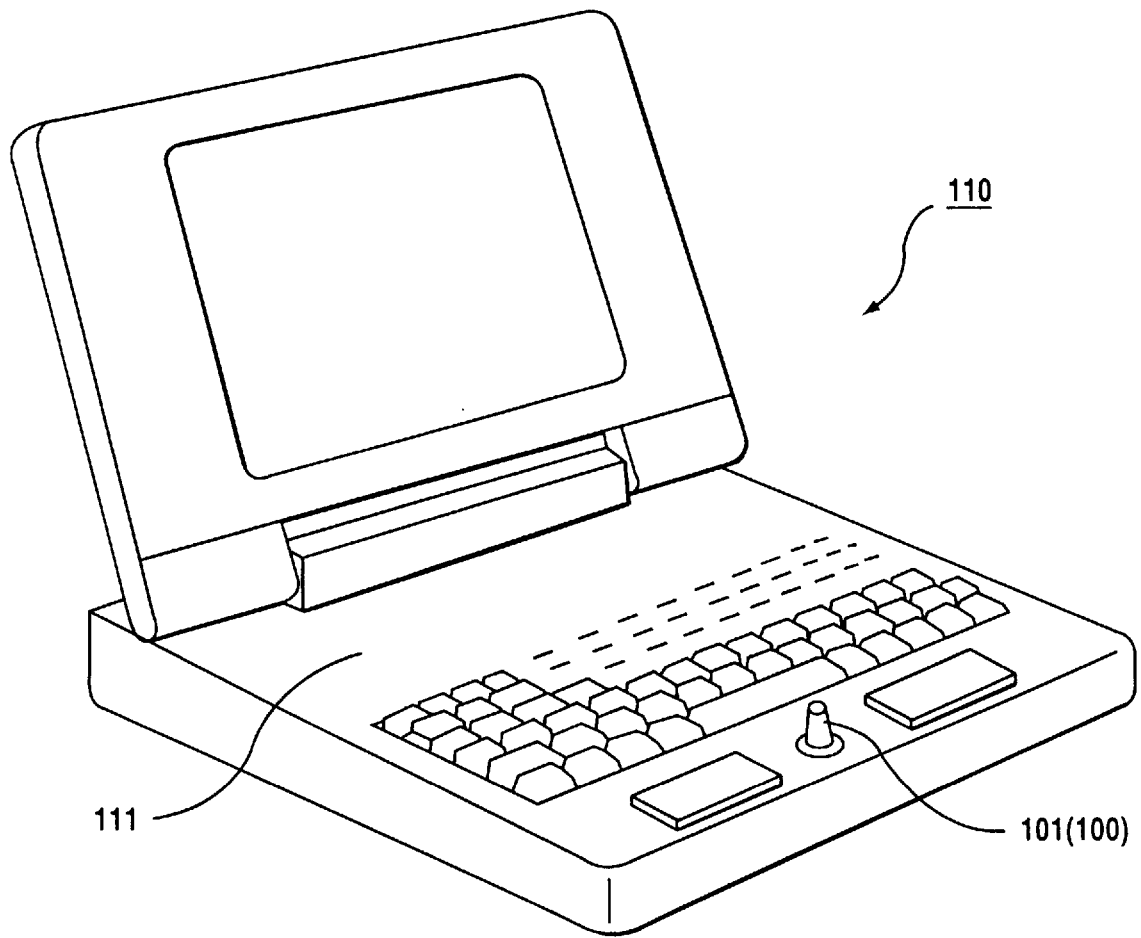
FIG. 8 is a perspective view of a personal computer 110 equipped with the conventional pointing device 100.
Figure 9:
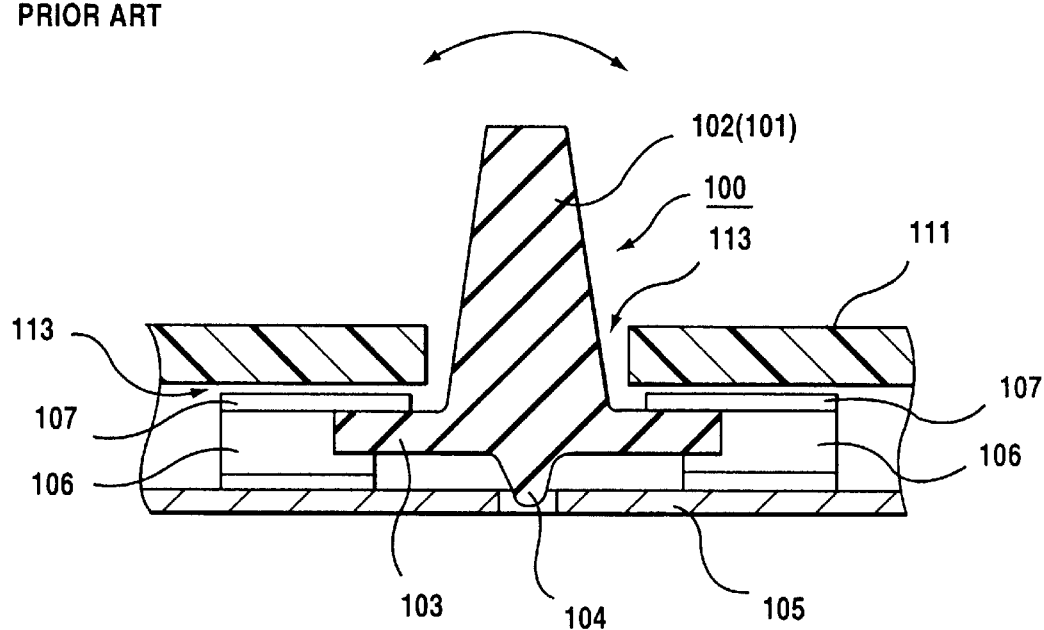
FIG. 9 is a sectional view showing the principal part of the conventional pointing device 100 mounted in the personal computer 110.
Figure 10:
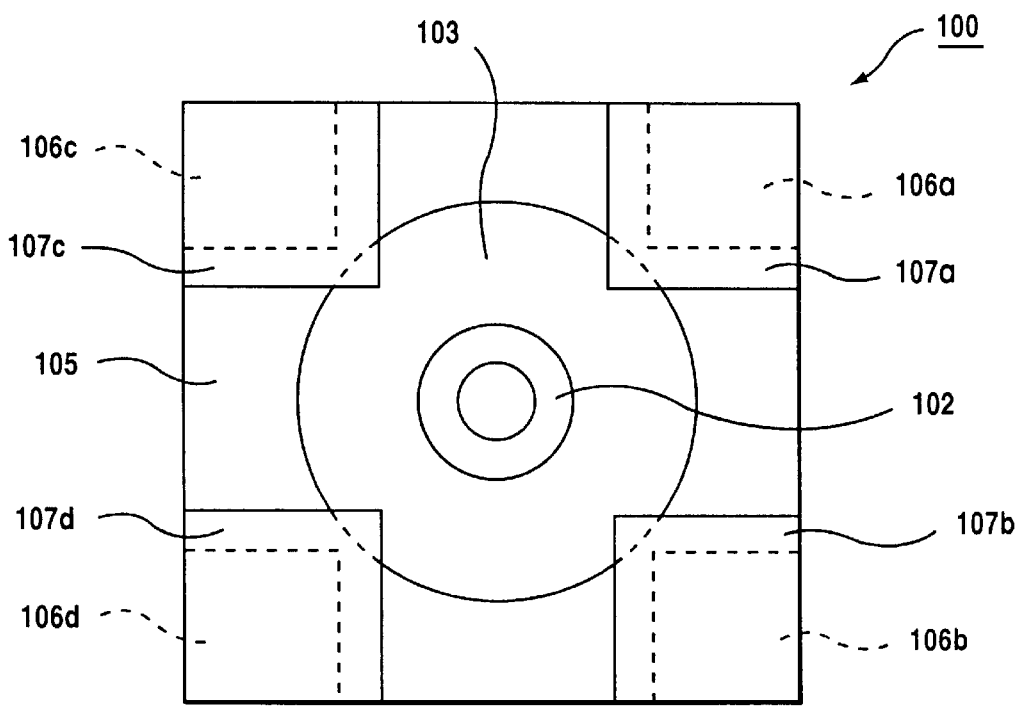
FIG. 10 is a plan view of the pointing device 100 shown in FIG. 9.

FIG. 6 schematically illustrates the principal part of a pointing device 30 according to a second embodiment of the present invention, which differs from the first embodiment in that a control button 31 formed of synthetic rubber is disposed on the tablet film sheets 11a and 11b used in the first embodiment.

As shown in FIG. 6, the control button 31 is a substantially square sheet-like member with its four marginal portions bent down in a manner to fit therein the tablet sheet 11. The pointing device 30 is mounted in the PC housing 2 with the marginal portions gripped between the rigid plate 12 supporting the tablet sheet 11 and the PC housing 2 so that the control button 31 is positioned on the tablet sheet 11.

The control button 31 has a centrally-disposed low-profile columnar protrusion 31a formed on the top thereof for depression with the user's finger and a downward protrusion 31b formed on the underside of the control button 31 just under the protrusion 31a. The downward protrusion 31b has a convex surface so that as the upper protrusion 31a is tilted while being depressed, the position on the tablet sheet 11 where to be pressed shifts in the direction of tilt of the protrusion 31a.

The pointing device 30 of this embodiment is identical in construction with the tablet pointer 10 of the first embodiment except for the control button 31. By tilting the control button 31 while depressing it, the cursor moves in the direction of tilt, so the cursor can be controlled in the same manner as in the case of using a joystick.

In the above, the relative position data (X, Y) is derived by computation from the pressed position $(x_n, y_n)$ detected at regular time intervals t, but when the pressed position takes an abnormal value, the cursor moves following the abnormal value. This can be avoided by averaging at regular time intervals t a plurality (three, for instance) of pieces of immediately previously pressed position data $(x_n, y_n), (x_n-1, y_n-1)$ and $(x_n-2, y_n-2)$ and then calculating the relative position (X, Y) from the average pressed position $(x_m, y_m)$ in the same manner as described above.

The present invention is not limited specifically to the above embodiments but can be modified in various ways.

For example, in the above embodiments the pressed position $(x_n, y_n)$ detected every time interval t is compared with the reference position $(x_0, y_0)$ to produce the cursor control data, but it is also possible to employ a scheme in which the position on the tablet sheet 11 being pressed is monitored and, when the tablet sheet 11 has been pressed continuously in excess of a predetermined distance, the position $(x_n, y_n)$ at that position is compared with the reference position $(x_0, y_0)$ to create the cursor control data.

The format of the cursor control data for output to the PC 1 is not limited specifically to the format shown in FIG. 7, but it may also be any of other formats for the output from pointing devices such as a mouse and a track ball.

While in the above the position detected first by the CPU 13 is used as the reference position $(x_0, y_0)$, the center of the tablet sheet 11 may be fixed as the reference position $(x_0, y_0)$. In particular, when the tablet sheet 11 is pressed continuously over a certain distance in the first embodiment, the position on the tablet sheet where it is pressed first may sometimes become unclear, presenting a problem in the operability of the pointing device. By setting the center of the tablet sheet 11 as the reference position $(x_0, y_0)$, it is possible for the user to perform continued pressing, taking the reference position into account at all times.

Since the movement of the cursor can be controlled by pressing the tablet sheet 11 at only one place, there is no need to control the cursor by detecting each newly pressed position to which the pressing is continued from the reference position—this enhances the operability of the pointing device.

In the second embodiment shown in FIG. 6, the absolute position where the downward protrusion 31b contacts the tablet sheet 11 first does not change, and when this position is set as a fixed reference position, the potential at the initially set reference position varies with time or due to environmental change,. with the result that the apparent reference position may sometimes shift from the initial reference position. Hence, in the pointing device 30 using the control button 31 according to the second embodiment, there is a fear of the cursor moving in unintended directions after extended usage of the pointing device. To avoid this problem, it is preferable that upon each pressing, the position being pressed first be set as the reference position.

Additionally, the position detecting means of the pointing device 10 of the first embodiment has been described to form a uniform potential gradient all over the tablet sheet 11 and detect the pressed position on the tablet film sheet 11a on the basis of the potential at the pressed position, but the method such as used for position detecting means of conventional tablets can also be employed. For example, it is possible to adopt position detecting means of the type that, when a finger or similar is brought close to the tablet film sheet 11a, detects the position thereon being approached through utilization of the electrostatic capacitance varying at that position. In the case of using such an electrostatic capacitance type position detecting means, the position on the tablet film sheet 11a approached is detected as the position where the tablet film sheet 11a is being pressed.

As will be appreciated from the above, the present invention possesses advantages such as described below.

According to the first aspect of the present invention, since the movement of the cursor is controlled on the basis of the position on the tablet sheet 11 where it is being pressed, the cursor can be controlled accurately in response to the manipulation of the pointing device.

Further, since the tablet sheet 11 is pressed to manipulate the pointing device for cursor control, the marginal portions of the tablet sheet 11 can closely joined to the PC housing 2, precluding the possibility of a gap being formed between them. Thus, there is no fear of water, dust or similar entering the PC housing 2.

Additionally, since the movement of the cursor can be controlled by the positional relationship of the pressed position to the reference position, the tablet sheet 11, even if narrow, can continuously be pressed to move the cursor over a desired distance. Hence, the pointing device, which utilizes the position detecting means for use in tablets, can be built in the PC housing 2.

According to the second aspect of the present invention, upon each pressing the tablet sheet 11, the reference position is set there, so that even if the reference position shifts from its initially set position due to an environmental change or with the lapse of time, there is no fear of malfunctions.

Accordingly, in the case of pressing the tablet sheet by the control button, the position on the tablet sheet 11 where it is pressed first is always set as the reference position, and the position thus initially set will not shift to anywhere.

According to the third aspect of the present invention, the cursor control data is output by pressing the tablet sheet 11 on its peripheral portion at one place alone. Accordingly, there is no need of detecting every position on the tablet sheet where it is pressed and setting the reference position each time. This speeds up the processing and does not always call for continued pressing over a required distance on the tablet sheet 11, hence providing improved operability of the pointing device.

Additionally, the continued pressing of the tablet sheet 11 can be done taking the reference position into account at all times.

According to the fourth aspect of the present invention, the movement of the cursor can be controlled by rocking the control button 31 while pressing it. Hence, the pointing device 30, which permits control of the cursor in the same manner as in the case of using a joystick, can be mounted in the limited space in the PC housing 2 with no gap therebetween.

It will be apparent that many modifications and variations may be effected without departing from the scope of the novel concepts of the present invention.

What is claimed is:

1. A pointing device mounted in a PC housing and outputting cursor control data for moving a cursor on a PC screen, said pointing device comprising:

a tablet sheet formed by a pair of opposed first and second tablet film sheets and disposed in parallel with a very small gap defined therebetween;

pressed position detecting means for detecting, as a tablet sheet pressed position coordinates $(x_n, y_n)$, the position where said first tablet film sheet is pressed into contact with said second tablet film sheet;

reference position setting means for setting reference position coordinates $(x_0, y_0)$ which do not vary at least until the pressure is removed from said tablet sheet after being applied thereto; and outputting means for outputting said cursor control data derived from data of a positional relationship between said pressed position coordinates $(x_n, y_n)$ and said reference position coordinates $(x_0, y_0)$;

wherein said pressed position detecting means detects said pressed position coordinates $(x_n, y_n)$ at regular time intervals, and said outputting means outputs updated cursor control data in response to newly detected pressed position coordinates by said pressed position detecting means.

2. The pointing device of claim 1 wherein said reference position setting means sets, as said reference position coordinates $(x_0, y_0)$, a position on said tablet sheet where pressure applied thereto is detected for a first time after a predetermined time period has passed during which no pressing has been detected on said tablet sheet.

3. The pointing device of claim 1, wherein said reference position setting means sets said tablet sheet's center as said reference position coordinates $(x_0, y_0)$.

4. The pointing device of any one of claims 1 to 3, wherein a control button with a downward protrusion formed on an underside thereof is disposed on said tablet sheet and is rocked to change position of application of pressure on said tablet sheet.

5. The pointing device of claim 1, wherein said outputting means outputs cursor control data derived from a difference between said pressed position coordinates $(x_n, y_n)$ and said reference position coordinates $(x_0, y_0)$.

* * * * *